US008483533B1

(12) United States Patent
Mehl (10) Patent No.: US 8,483,533 B1
(45) Date of Patent: Jul. 9, 2013

(54) FIBER-COUPLED LASER DIODE ILLUMINATION SYSTEMS WITH STABLE BEAM PROPAGATION

(75) Inventor: Ronii Chris Mehl, Brush Prairie, WA (US)

(73) Assignee: nLight Photonics Corporation, Vancouver, WA (US)

( * ) Notice: Subject to any disclaimer, the term of this patent is extended or adjusted under 35 U.S.C. 154(b) by 496 days.

(21) Appl. No.: 12/421,509

(22) Filed: Apr. 9, 2009

Related U.S. Application Data (60) Provisional application No. 61/043,978, filed on Apr. 10, 2008.

(51) Int. Cl.
*G02B 6/02* (2006.01)
*G02B 6/028* (2006.01)
*G02B 6/036* (2006.01)

(52) U.S. Cl.
USPC .......................................... 385/124; 385/127

(58) Field of Classification Search
USPC ................................................ 385/124, 127
See application file for complete search history.

(56) References Cited

U.S. PATENT DOCUMENTS

| | | | | |
|---|---|---|---|---|
| 5,568,318 A * | 10/1996 | Leger et al. | ..................... | 359/618 |
| 6,421,489 B1 * | 7/2002 | Berkey et al. | ................... | 385/123 |
| 6,532,244 B1 * | 3/2003 | Dewey et al. | ............. | 372/29.014 |
| 7,561,769 B2 * | 7/2009 | Fujimoto et al. | ................. | 385/32 |
| 7,729,574 B2 * | 6/2010 | Moriarty | ......................... | 385/28 |
| 2003/0031442 A1 * | 2/2003 | Siegman | ........................ | 385/124 |
| 2004/0228593 A1 * | 11/2004 | Sun et al. | ........................ | 385/127 |
| 2005/0265678 A1 * | 12/2005 | Manyam et al. | .............. | 385/127 |
| 2007/0086501 A1 | 4/2007 | Karlsen | | |
| 2007/0116077 A1 | 5/2007 | Farmer et al. | | |
| 2007/0196062 A1 * | 8/2007 | Inoue et al. | .................... | 385/123 |
| 2008/0063348 A1 * | 3/2008 | Kumano et al. | ............... | 385/127 |
| 2008/0166094 A1 * | 7/2008 | Bookbinder et al. | .......... | 385/124 |
| 2009/0092365 A1 * | 4/2009 | Donlagic | ....................... | 385/124 |

OTHER PUBLICATIONS

"Truncated parabolic-index fiber with minimum mode dispersion" by Geshiro et al, IEEE Transaction on Microwave Theory and Technology, vol. 26, No. 2, pp. 115-119, 1978.*
"Analysis of wave modes in slab waveguide with truncate parabolic index" by Geshiro et al, IEEE Journal of Quantum Electronics, vol. 10, No. 9, pp. 647-649, 1974.*

* cited by examiner

*Primary Examiner* — Ryan Lepisto
*Assistant Examiner* — Robert Tavlykaev
(74) *Attorney, Agent, or Firm* — Klarquist Sparkman, LLP

(57) ABSTRACT

Optical illuminators comprise optical fibers having a gradient index core and a cladding selected so that a refractive index difference at a core/cladding interface provides a numerical aperture less than, greater than, or equal to a numerical aperture of the gradient index core. In some examples, a maximum refractive index difference in the gradient index core is substantially the same as, less than, or greater than the refractive index difference at the core/cladding interface. Illuminators based on such fibers are configured to produce optical beams with a laser diode or diode array, and to provide stable, approximately Gaussian optical fluxes at a fiber output surface.

35 Claims, 8 Drawing Sheets

FIBER-COUPLED LASER DIODE ILLUMINATION SYSTEMS WITH STABLE BEAM PROPAGATION

CROSS-REFERENCE TO RELATED APPLICATION

This application claims the benefit of U.S. Provisional Patent Application 61/043,978, which was filed Apr. 10, 2008, and that is incorporated herein by reference.

TECHNICAL FIELD

This application pertains to laser diode illumination systems that include optical fibers that produce stable, uniform output power distributions.

BACKGROUND

Optical fibers are commonly used for delivery of optical beams produced by laser sources such as laser diodes to a work surface or other target. Optical fibers offer many advantages over conventional optical systems used for beam delivery as optical fiber based systems tend to be small, inexpensive, and permit convenient beam delivery even to difficult locations. Optical fibers of many sizes and designs are commercially available, and system designers have many options.

One shortcoming of conventional fiber beam delivery is that the optical beams produced tend to be non-uniform, and often include beam areas in which beam flux (optical power/area) is significantly larger or smaller than an average beam flux. In some cases, non-uniform beams that are input to a fiber delivery system are reproduced at the beam delivery output with substantially the same non-uniformity. In many conventional fiber beam delivery systems, even if uniform beam flux were achieved, slight fiber bendings tend to produce non-uniform beam fluxes or otherwise alter beam flux.

Thus, using conventional fiber delivery systems, beam fluxes tend to be non-uniform and variable. Disclosed herein are representative methods and apparatus for beam delivery that generally tend to produce uniform, stable beam fluxes.

SUMMARY

Optical illuminators comprise a laser diode beam source configured to produce an optical flux and an optical system configured to produce an optical beam based on the optical flux. A gradient index fiber is situated to receive the optical beam and direct the optical beam to a target, wherein the gradient index fiber includes a cladding and a gradient index core such that a numerical aperture defined by a core/cladding refractive index difference is at least about 0.04. In typical examples, the beam source provides optical radiation in a wavelength range of from at least about 200 nm to about 10 μm. In some examples, the laser diode beam source comprises a plurality of laser diodes, and the optical system is configured to produce an optical beam in which optical fluxes produced by the plurality of laser diodes overlap at or near an input surface of the gradient index fiber. In some examples, the fluxes overlap but are incident to the fiber at substantially different angles. In further examples, a maximum refractive index difference associated with the core is substantially the same as an index difference associated with a core/cladding interface. In additional embodiments, the laser diode beam source comprises a two dimensional array of emission regions, and the optical system is configured to substantially overlap optical fluxes from the emission regions at an input surface of the gradient index fiber. In further representative examples, the cladding has a refractive index $n_{CLAD}$, the core has a refractive index $n(0)$ near a core center and a refractive index $n(r_{MAX})$ at a core/cladding interface, wherein $n^2(r_{MAX})-n^2_{CLAD}$ is in a range of between about $[n^2(0)-n^2(r_{MAX})]/10$ and $2[n^2(0)-n^2(r_{MAX})]$. In other examples, $n^2(r_{MAX})-n^2_{CLAD}$ is approximately equal to $n^2(0)-n^2(r_{MAX})$. In still other examples, the numerical aperture defined by the core/cladding interface is at least about 0.10, or a numerical aperture of the core and a core/cladding boundary numerical aperture are between about 0.04 and about 0.50. In additional examples, the core numerical aperture and the core/cladding boundary numerical aperture are between about 0.10 and about 0.30. In typical examples, the core comprises doped fused silica.

In additional representative examples, a refractive index of the gradient index core is a function of a distance r from a center of the core. In some examples, the refractive index of the core is a function of $r^{1'}$, wherein p is a number between 1 and 3. In additional examples, the refractive index of the core is approximately $$n(0)\left(1 - B\frac{r^2}{2}\right)$$

for $|r| < r_{MAX}$, wherein r is a radial distance from a core center, $r_{MAX}$ is a radius of the core, $n(0)$ is core refractive index at r=0, and B is a constant. In typical examples, a core diameter is between about 0.05 mm and about 2.00 mm.

Illumination systems comprise a laser diode beam source that includes a plurality of lasers, wherein each of the plurality of lasers is configured to produce a respective optical beam, wherein the beams are spatially displaced and propagate along a common optical axis. A combiner lens is situated to receive the optical beams and direct the optical beams to a common location. A center-enhanced fiber is situated to receive the optical beams at an input end and guide the received optical beams to an output end. In further examples, the center-enhanced fiber includes a cladding and a gradient index core, wherein the cladding is configured to provide a refractive index difference at a core/cladding boundary. In further examples, a numerical aperture of the core and a numerical aperture associated with a core/cladding boundary are between about 0.04 and 0.50. In additional examples, the input end of the center-enhanced fiber is situated substantially at the common location.

Optical waveguides comprise a core having a variable refractive index that decreases from a central axis and a cladding situated about the core, wherein the variable refractive index defines a core numerical aperture and a refractive index difference between the core and the cladding defines a core/cladding boundary numerical aperture that is greater than about 0.04. In some examples, the core numerical aperture and the core/cladding numerical aperture are substantially the same.

In some examples, the variable refractive index of the core is approximately $$n(0)\left(1 - B\frac{r^2}{2}\right)$$

for $|r| < r_{MAX}$, wherein r is a radial distance from a core center, $r_{MAX}$ is a radius of the core, $n(0)$ is core refractive index at r=0, and B is a constant. In further examples, the cladding has a refractive index $n_{CLAD}$, and $n^2(r_{MAX})-n^2_{CLAD}$ is approximately equal to $n^2(0)-n^2(r_{MAX})$. In representative examples, the core and the core/cladding boundary numerical apertures are between about 0.10 and about 0.27, or between about 0.15 and about 0.23. In some examples, the core numerical aperture and the numerical aperture associated with the core/cladding boundary are substantially the same.

Methods comprise providing a fiber having a variable refractive index core and a cladding, wherein a numerical aperture associated with a core/cladding boundary is greater than about 0.05. Optical beams from a plurality of emitters are coupled into an input end of the fiber and the coupled optical beams are directed from an output end of the fiber to a target. In some examples, the target is a laser gain material. According to some examples, the cladding refractive index is a variable refractive index. In some examples, a fiber length is selected, typically in a range of between about 2 cm and 2 m.

According to some examples, optical waveguides comprise a core having a variable refractive index that decreases from a central axis and defines a core numerical aperture. A cladding is situated about the core, wherein a refractive index difference between the core and the cladding defines a cladding numerical aperture, wherein the core numerical aperture and the cladding numerical aperture are substantially the same. In some embodiments, the variable refractive index of the core is approximately $$n(0)\left(1 - B\frac{r^2}{2}\right)$$

for $|r|<r_{MAX}$, wherein r is a radial distance from a core center, $r_{MAX}$ is a radius of the core, n(0) is core refractive index at r=0, and B is a constant. In representative embodiments, the cladding has a refractive index $n_{CLAD}$, and $n^2(r_{MAX})-n^2_{CLAD}$ is approximately equal to $n^2(0)-n^2(r_{MAX})$. According to other examples, the core and the cladding numerical apertures are between about 0.10 and about 0.27 or between about 0.15 and about 0.23. In some examples, the core comprises doped fused silica.

In other examples, optical waveguides comprise a core having a refractive index that varies between a maximum value and a minimum value that define a first refractive index difference. A cladding has a substantially constant cladding refractive index, wherein a second refractive index difference is associated with a difference between the minimum values of the core refractive index and the cladding refractive index. Typically, the first refractive index difference and the second refractive index difference are substantially equal, but in other examples, these differences are not equal. In some examples, the core refractive index varies as a function of $|r|^p$, wherein r is a radial distance from a core center and p is a number between 1.0 and 3.0. In some examples, the core diameter is between about 0.05 mm and about 2.00 mm, and the cladding diameter is between about 0.06 mm and 3.0 mm, Optical illuminators comprise a laser diode beam source configured to produce an optical flux and an optical system configured to produce an optical beam based on the optical flux. A gradient index fiber is situated to receive the optical beam and direct the optical beam to a target, wherein the gradient index fiber includes a cladding and a gradient index core such that a numerical aperture defined by a gradient index core refractive index and a numerical aperture defined by a difference between a cladding refractive index and the core refractive index are substantially the same. In other examples, these numerical apertures differ by a factor of between 0.1 and 10, or between 0.2 and 5, or between 0.25 and 4. In some examples, the laser diode beam source comprises a plurality of laser diodes, and the optical system is configured to produce an optical beam in which optical fluxes produced by the plurality of laser diodes overlap at an input surface of the gradient index fiber. In other examples, a maximum refractive index difference associated with the core is substantially the same as an index difference associated with a core/cladding interface. In some examples, the laser diode beam source comprises a two dimensional array of emission regions, and the optical system is configured to substantially overlap optical fluxes from the emission regions at an input surface of the gradient index fiber. In other representative embodiments, the cladding has a refractive index $n_{CLAD}$, the core has a refractive index n(0) near a core center, and a refractive index $n(r_{MAX})$ at a core/cladding interface, and $n^2(r_{MAX})-n^2_{CLAD}$ is approximately equal to $n^2(0)-n^2(r_{MAX})$. In additional embodiments, a refractive index of the gradient index core is a function of a distance r from a center of the core. In some representative examples, the refractive index of the gradient index core is a function of $|r|^p$, wherein p is a number between 1 and 3.

Methods comprise selecting a variable refractive index for a fiber core and selecting a cladding refractive index such that numerical aperture defined by a refractive index difference at a core/cladding boundary is greater than about 0.02. or 0.04. A fiber or other waveguide is provided based on the selected variable refractive index and the cladding refractive index. In some examples, an optical flux is directed to an input surface of the optical fiber and from an output surface of the optical fiber to a target. In representative examples, the target is a laser gain material. In additional examples, the cladding refractive index is a variable refractive index.

These and other features and aspects of the disclosed technology are set forth below with reference to the accompanying drawings.

DETAILED DESCRIPTION

As used in this application and in the claims, the singular forms "a," "an," and "the" include the plural forms unless the context clearly dictates otherwise. Additionally, the term "includes" means "comprises."

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods which function in the manner described by such theories of operation.

Optical fibers or other optical waveguides are generally based on a variation of refractive index as a function of distance from a propagation axis. Such refractive index variations include so-called index steps such as those associated with typical step index fibers and continuous variations such as those associated with typical gradient index fibers. Many convenient examples are based on optical fibers having circular cross-sections, but elliptical, oval, rectangular, polygonal, or other shapes can be used. Such fibers generally include a central core that is surrounded by a cladding region and the core and cladding are selected to provide guided wave transmission. A representative illumination system based on a step index fiber is illustrated in FIG. 6.

Figure 6:
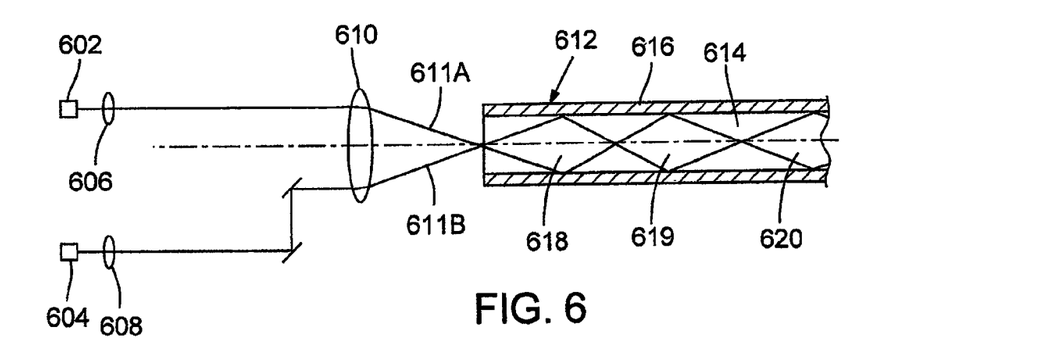
FIG. 6 is a schematic diagram of a laser diode based illuminator that includes a step index output fiber.
Figure 7A:
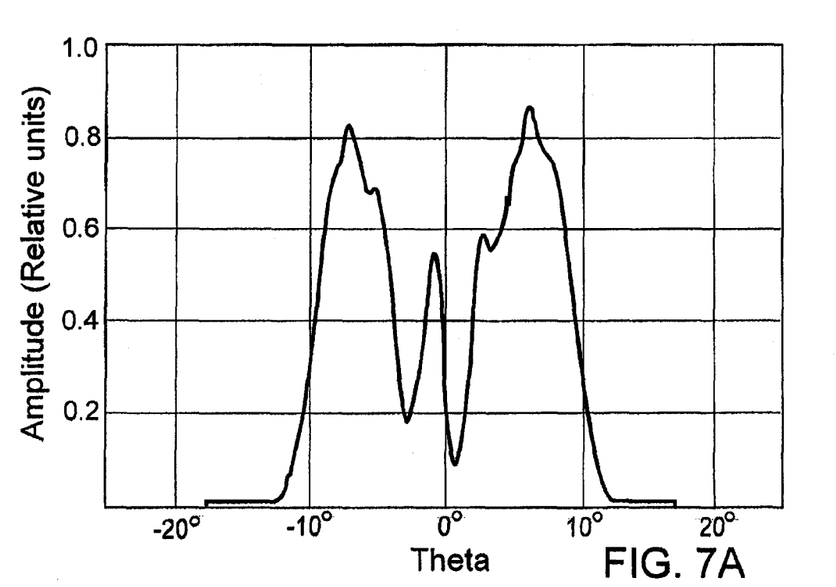
FIGS. 7A-7B illustrate output power distributions associated with the illuminator of FIG. 6. The distribution of FIG. 7A is produced with an unstressed fiber and the distribution of FIG. 7B is produced with a stressed fiber.
Figure 7B:
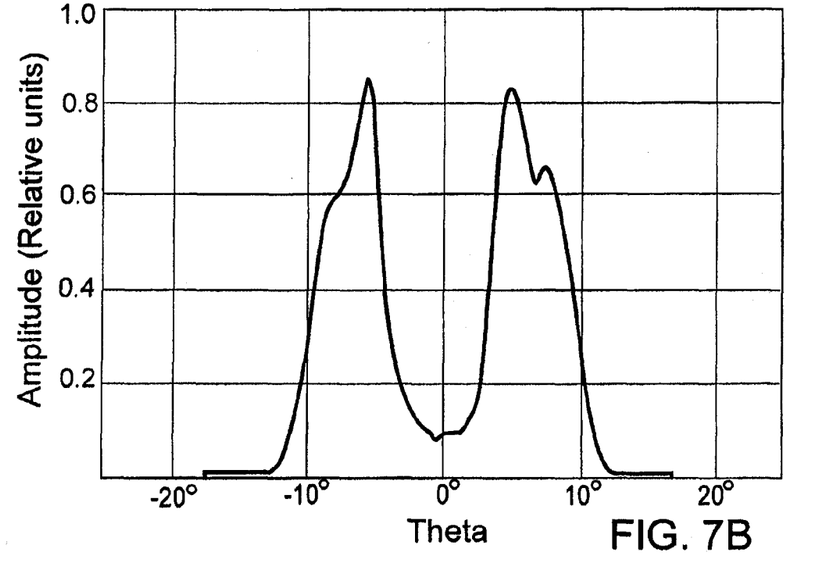

As shown in FIG. 6, laser diodes 602, 604 produce outputs that are collimated by respective lenses 606, 608 and the collimated beams are incident to a combiner lens 610. The beams are directed into an optical fiber 612 along axes 611A, 611B. The optical fiber 612 includes a core 614 and a cladding 616, and has propagation characteristics based on an index difference between the core 614 and the cladding 616. As shown in FIG. 6, the beams propagating in the fiber 612 continue along the axes 611A, 611B so that regions 618, 619, 620 of the core 618 carry little optical power. The regions 618, 619, 620 are defined by angles of incidence of the input beams (i.e., directions of the axes 611A, 611B), and produce a so-called numerical aperture gap associated with no (or reduced) optical power as shown in FIGS. 7A-7B. Both of the output power distributions of FIGS. 7A-7B have a donut-like appearance with reduced optical power on-axis. In addition, if the optical fiber 610 is bent or otherwise disturbed, the power distribution of FIG. 7A changes into that of FIG. 7B. Thus, the system of FIG. 6 produces a non-uniform output power distribution with a central hole or other non-uniformities, and this power distribution varies with fiber movement. Such non-uniform, unstable power distributions are problematic in many applications.

Relative powers in cones of varying numerical apertures ("cone NA") produced by a step index fiber as described above are listed in Table 1 for two different fiber positions, but with fixed fiber ends. Total output powers were measured to be 1.189 mW and 1.446 mW for the first and second positions, respectively.

TABLE 1

| Relative power in cones of varying numerical apertures for conventional step index fiber. | | |
|---|---|---|
| Cone NA | Relative Power (first position) | Relative Power (second position) |
| 0.087 | 0.205 | 0.166 |
| 0.174 | 0.904 | 0.912 |
| 0.707 | 1.000 | 1.000 |

As shown by the data of Table 1 and FIGS. 7A-7B, output power distribution depends on fiber position when step index fibers are used for beam delivery, particularly at low cone angles.

Figures 1A, 1B:
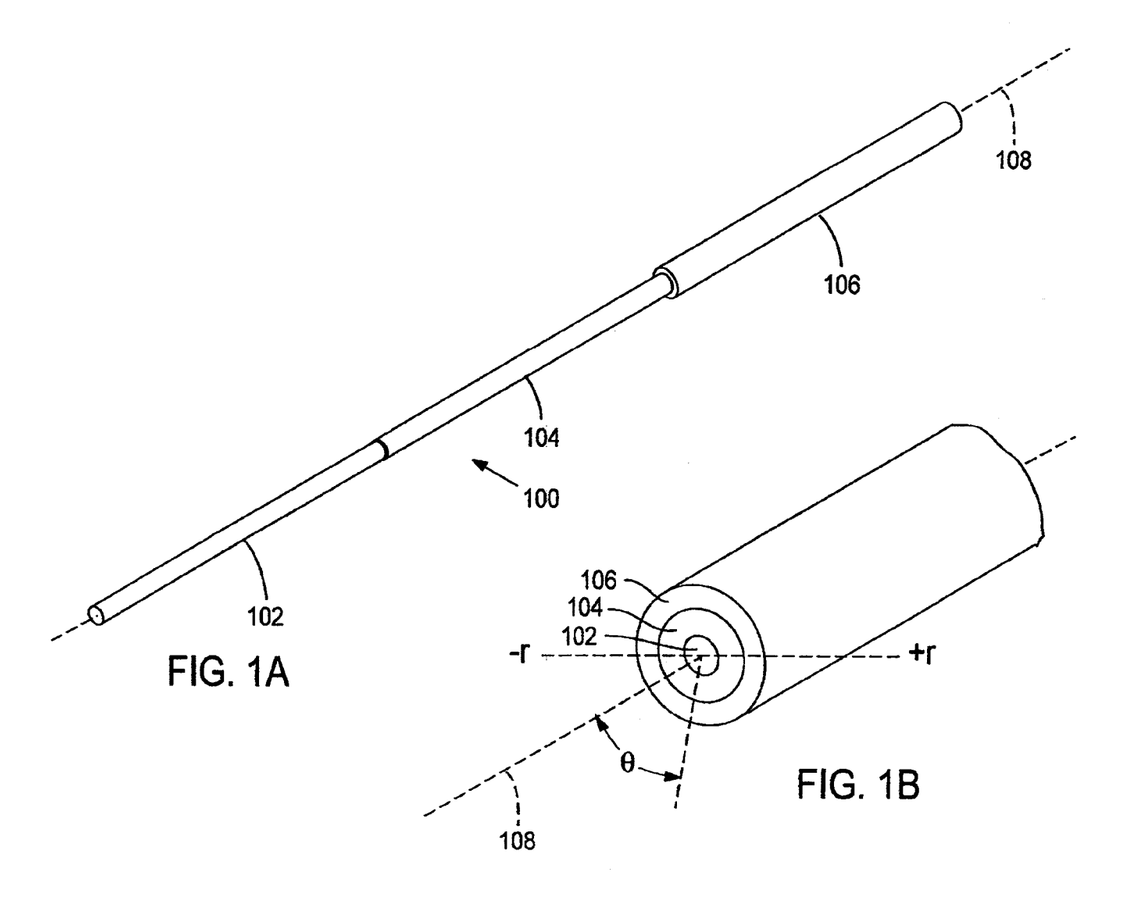
FIGS. 1A-1B illustrate a representative graded index multimode fiber having a gradient index core and an index step at a core/cladding interface.

A representative example of an illumination system fiber based on both an index step and a gradient index is illustrated in FIGS. 1A-1B. As shown in FIGS. 1A-1B a section of fiber 100 includes a core 102, a cladding 104, and a buffer coating 106 that define a propagation axis 108. The core 102 generally consists of fused silica that is doped so as to have a refractive index that varies continuously (generally decreases monotonically) as a function of radial distance from the propagation axis 108, but other refractive index variations such as those based on a one or more index steps can be used. The cladding 104 is typically a fluorine doped glass, and the buffer layer 106 is an acrylate. In some examples, an additional buffer can be provided, such as a hard elastomeric buffer coating. In the example of FIGS. 1A-1B, the core, cladding, and buffer diameters are about 600 μM, 720 μm, and 1050 μm, respectively. The core 102 and cladding 104 are preferably concentric to within about 9 μm.

Figure 2A:
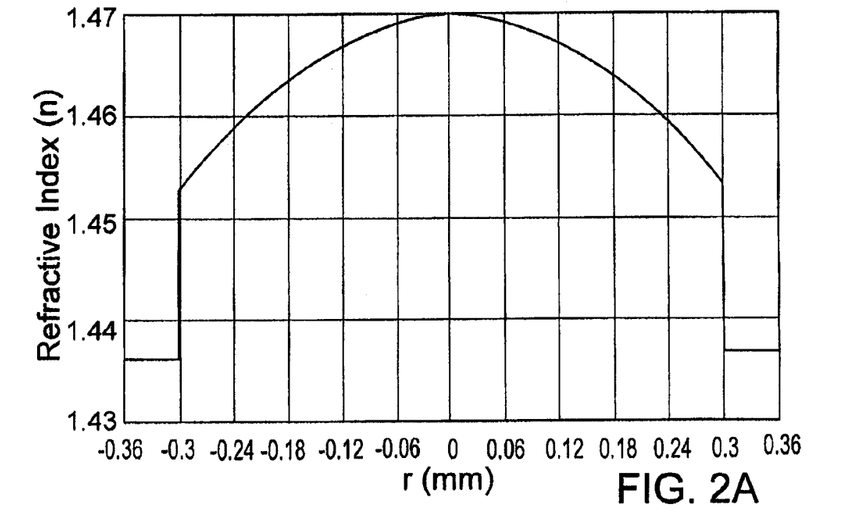
FIG. 2A is a graph of refractive index as a function of radial distance from a fiber propagation axis for the example optical fiber illustrated in FIGS. 1A-1B.

The core 102 and the cladding 104 are configured to have a refractive index n(r) that is a function of radial distance r from the axis 108:

$n(r)=1.4366$, for $|r|>0.3$ mm, and $$n(r) = 1.4698\left(1 - 0.2494\frac{r^2}{2}\right),$$

for $|r|<0.3$ mm, wherein r is measured in mm.
This refractive index profile is illustrated in FIG. 2A.

Figure 2B:
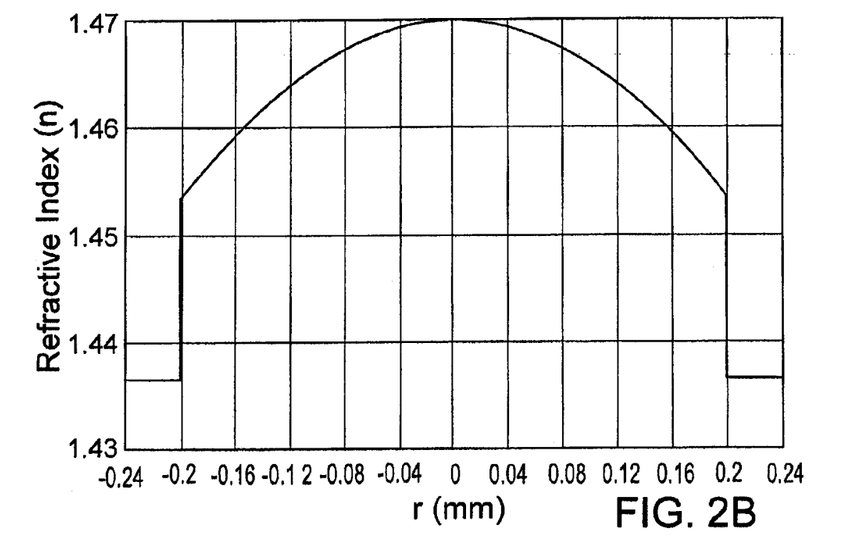
FIG. 2B is a graph of refractive index as a function of radial distance from a fiber propagation axis for another example optical fiber similar to that illustrated in FIGS. 1A-1B but having different core and cladding dimensions.

The particular variable refractive index and dimensions associated with FIGS. 1A-1B are examples only. In another example, core, cladding, and buffer diameters are 400 μm, 480 μm, and 750 μm, respectively, and the refractive index n(r) is given by:

$n(r)=1.4366$, for $|r|>0.2$ mm, and $$n(r) = 1.4699\left(1 - 0.563\frac{r^2}{2}\right),$$

for $|r|<0.2$ mm, wherein r is in units of mm.
This refractive index profile is illustrated in FIG. 2B.

In the examples, described above, the refractive index profiles n(r) are selected so that numerical apertures associated with the gradient index core and the core/cladding boundary are substantially the same, but in other examples these numerical apertures can be different. For example, the numerical aperture associated with the core/cladding boundary can be greater than, less than, or substantially the same as that of the gradient index core. In addition, while gradient profiles are described in some examples as substantially continuous functions of radial distance r, in other examples, gradient index fibers are based on a series of 2, 3, 4, 5, 6, or more refractive index steps or a combination of steps and substantially continuous functions. In some examples, such index steps are spaced between about, 0.1 μm, 0.2 μm, 0.5 μm, 1.0 μm, 10.0 μm or other larger or smaller spacings. A refractive index step at a core/cladding boundary need not be abrupt, but can extend over distances that are generally substantially less than a core dimension, typically less than about 0.1%, 1%, 2%, or 5% of a core dimension. For convenience, a step index refers to a change in refractive index Δn over a distance d such that dΔn is less than about 1%, 2%, or 10% of a wavelength to be propagated. Thus, a series of small refractive index steps can serve to define a gradient index fiber. In any case, depending on application requirements, refractive index can increase or decrease in a fiber core as a function of radial coordinate. Fibers having variable refractive indices in a fiber core and a core/cladding refractive index configured to provide a selected spatial and angular distribution are referred to herein as light shaping fibers. While the disclosed examples are directed to radially symmetric fibers, a core minimum or maximum refractive index need not be at a fiber center.

While parabolic refractive index profiles can be convenient, gradient indices can be based on other powers or combinations of powers of the radial coordinate r ($r^3$, $r^4$, $r^5$) or other functional forms. As noted above, a series of two or more index steps can be configured to approximate a continuous refractive index variation.

For typical gradient index and step index fiber designs, fiber numerical aperture is approximately $n_1\sqrt{2\Delta}$, wherein $$\Delta = \frac{n_1^2 - n_2^2}{2n_1^2},$$

$n_1$ is a refractive index at fiber center (gradient index) or in a fiber core (step index), and $n_2$ is refractive index just inside a core/cladding boundary (gradient index) or is a cladding refractive index. For the index profiles of FIGS. 2A-2B in which a graded index core terminates at an index step, $n_1$ is the refractive index at the center of the core, and $n_2$ is the lowest refractive index associated with the gradient index core, i.e., the refractive index of the gradient index core at the core/cladding interface. For determination of the numerical aperture associated with the core/cladding boundary, $n_1$ is the refractive index of the outermost portion of the gradient index core, and $n_2$ is the refractive index of the cladding. By selecting these values appropriately so that the numerical apertures are substantially the same, the numerical aperture of the fiber is substantially constant as a function of the radial distance |r|. This reduces propagation losses and tends to provide uniform, stable intensity distributions that remain substantially constant, even if the fiber is bent or is moved. As noted above, in other examples, the core/cladding boundary can be associated with numerical apertures that are less than or greater than that of the core. In typical examples, the core/cladding boundary is associated with a numerical aperture that is between about 0.04 and 0.50, and the core and the core/cladding boundary numerical apertures need not be the same.

Figure 3A:
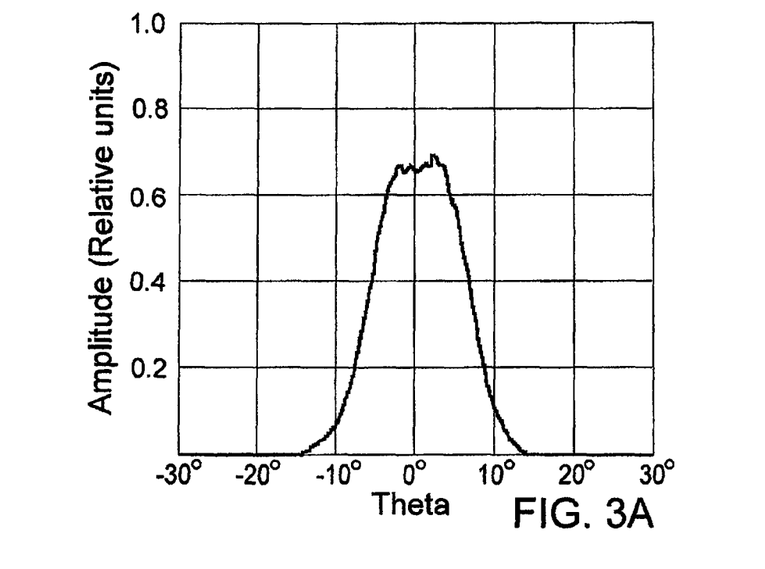
FIGS. 3A-3B illustrate measured output power as a function of output angle θ for a representative gradient index fiber with a core/cladding index step. The output powers of FIG. 3A and FIG. 3B are measured with unstressed fiber and stressed fiber (50 mm bend diameter), respectively.
Figure 3B:
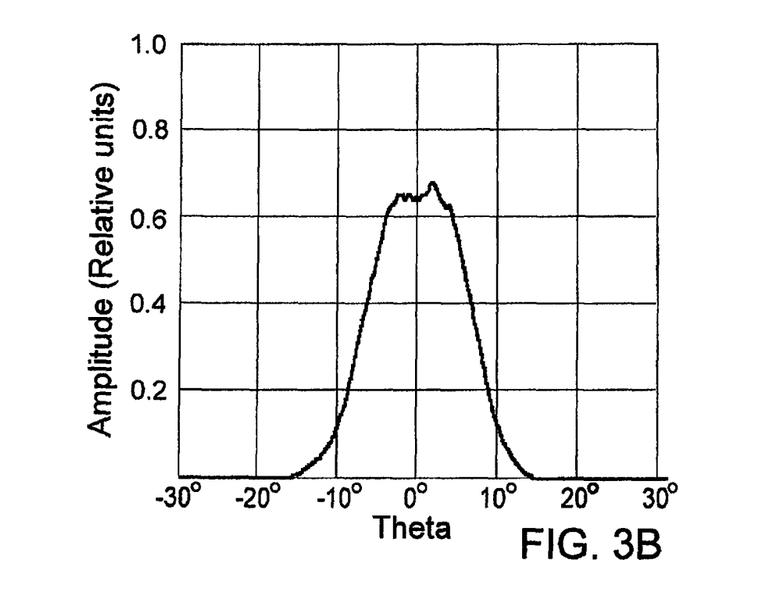

In another example, a representative fiber has a 550 μm gradient index core with a design refractive index $n(r)=1.4366$, for $|r|>0.275$ mm, and $$n(r) = 1.4698\left(1 - 0.295\frac{r^2}{2}\right),$$

for $|r|<0.275$ mm,
was fabricated. A length of such fiber (about 1-2 m) was coupled to a laser diode array similar that described in Farmer et al., U.S. Patent Application Publication 2007/0116077, and output powers as a function of output angle θ were measured with results as shown in FIGS. 3A-3B. FIG. 3A corresponds to an unstressed (straight) fiber length and FIG. 3B corresponds to a stressed fiber produced by bending. Relative powers in cones of varying numerical apertures ("cone NA") produced by stressed and unstressed fibers as described above are listed in Table 3. Fiber stress was produced by wrapping a section of fiber to form a bend of radius of about 50 mm. Total output powers were measured to be 1.236 mW and 1.241 mW for the unstressed and stressed fibers, respectively.

TABLE 2

Relative power in cones of varying numerical apertures.

| Cone NA | Relative Power (Unstressed Fiber) | Relative Power (Stressed Fiber) |
|---|---|---|
| 0.087 | 0.40 | 0.40 |
| 0.174 | 0.91 | 0.91 |
| 0.707 | 1.00 | 1.00 |

Output numerical aperture was also measured corresponding to a beam angular radius that captures various fractions of total output power (for example, 50%, 90%, and 95%). Results are summarized in Table 3.

TABLE 3

Measured output beam NA as function of captured beam power.

| Relative Power | Output NA Unstressed Fiber | Output NA Stressed Fiber |
|---|---|---|
| 50% | 0.099 | 0.101 |
| 90% | 0.170 | 0.170 |
| 95% | 0.191 | 0.190 |

As shown in FIGS. 3A-3B, an optical flux produced by a gradient index fiber with an index step at a core/cladding interface provides stable power output with power variations of less than about 0.5%, 1%, 2%, 5%, or 10% in cones of numerical aperture greater than 0.05 even if the fiber is moved or bent. In addition, an angular power distribution remains substantially constant with numerical apertures ranging up to at least 0.2. In addition, output power distributions have maximum powers substantially on-axis. Typically, a power on-axis is a maximum power, or is within about 1%, 2%, 5%, or 10% of a maximum power. In addition, in a cone of angular radius $\theta_{CONE}$ sufficient to receive about 50%, 90%, or 95% of total power, minimum powers in the cone occur substantially at the angle $\theta_{CONE}$. Typically, power at the angle $\theta_{CONE}$ is a minimum, or within about 0.5%, 1%, 2%, 5%, or 10% of the minimum. In typical examples, an axis associated with an emitted optical power distribution is substantially the same as a propagation axis of the fiber that provides the emitted power, but in some examples, the axes are different. Fibers and illumination systems that provide distributions having central or on-axis maxima (or approximate maxima) and for which power decreases substantially monotonically as a function of angle are referred to herein as center-enhanced fibers and illumination systems. In some examples, power distributions provided by such fibers and systems are approximately Gaussian, but other distributions can be obtained.

Center-enhanced fibers can receive input optical power having relatively little power at some numerical apertures, typically at low numerical apertures and produce Gaussian or other power distributions having substantially or approximately maximum optical power on-axis. Such fibers can transform beams that include substantial optical power in relatively high order fiber modes and lower power in lower order fiber modes into beams which consist primarily of lower order modes. In this way, donut shaped beams can be converted into Gaussian or other beams. In addition, these center-enhanced fibers can provide such transformations with low power loss, so that output power can be at least as much as 80%, 85%, 90%, 95%, or 99% of the optical power coupled into the fiber prior to beam shape conversion. In the disclosed examples, index gradients that decrease monotonically from a maximum on-axis refractive index are described. In other examples, gradient index profiles that have on-axis local relative minima can be provided to obtain output power distributions that are more uniform than Gaussian. Additional relative minima can also be provided to shape output power distribution for a particular application.

Figure 4A:
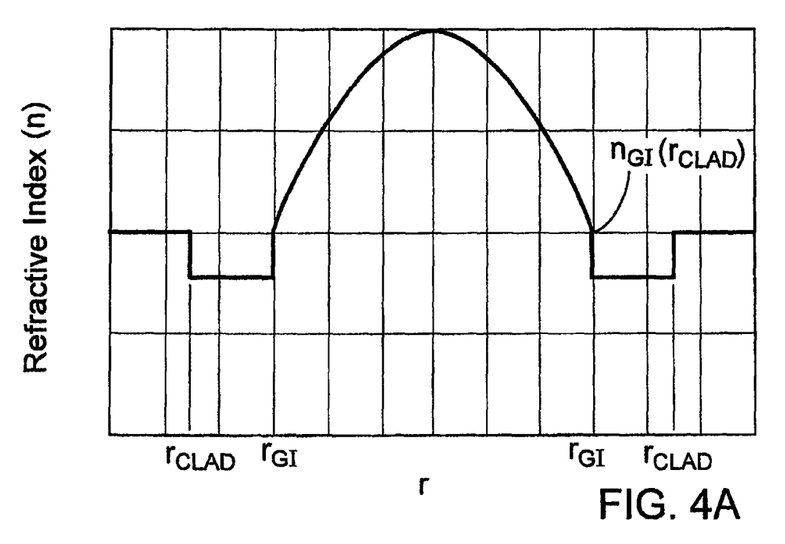
FIGS. 4A-4B are graphs of refractive index as a function of radial distance from a fiber propagation axis for additional exemplary fibers.
Figure 4B:
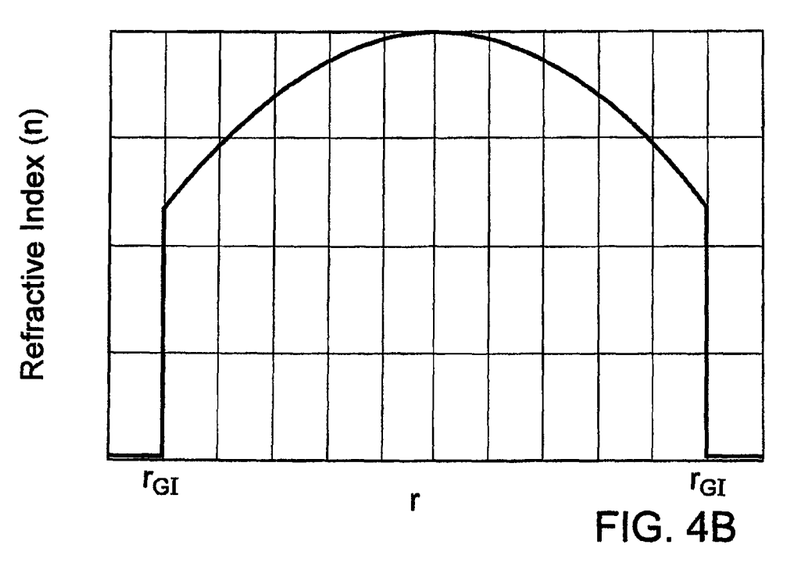

Additional representative refractive index profiles are illustrated in FIGS. 4A-4B. As shown in FIG. 4A, a fiber has a gradient index core of radius $r_{GI}$ and a cladding of radius $r_{CLAD}$, wherein a refractive index difference provided by the gradient index core is larger than a refractive index difference at the core/cladding boundary. Accordingly, a core numerical aperture is greater than a numerical aperture associated with the core/cladding boundary. In the example of FIG. 4B, a fiber has a gradient index core of radius $r_{GI}$ and a cladding of radius $r_{CLAD}$, wherein a refractive index difference provided by the gradient index core is smaller than a refractive index difference at the core/cladding boundary. Accordingly, a core numerical aperture is smaller than a numerical aperture associated with the core/cladding boundary. The example of FIG. 4A also includes a buffer region or an additional cladding region that surrounds the core and cladding, and has a refractive index that is greater than that of the cladding.

Figures 5A, 5B:
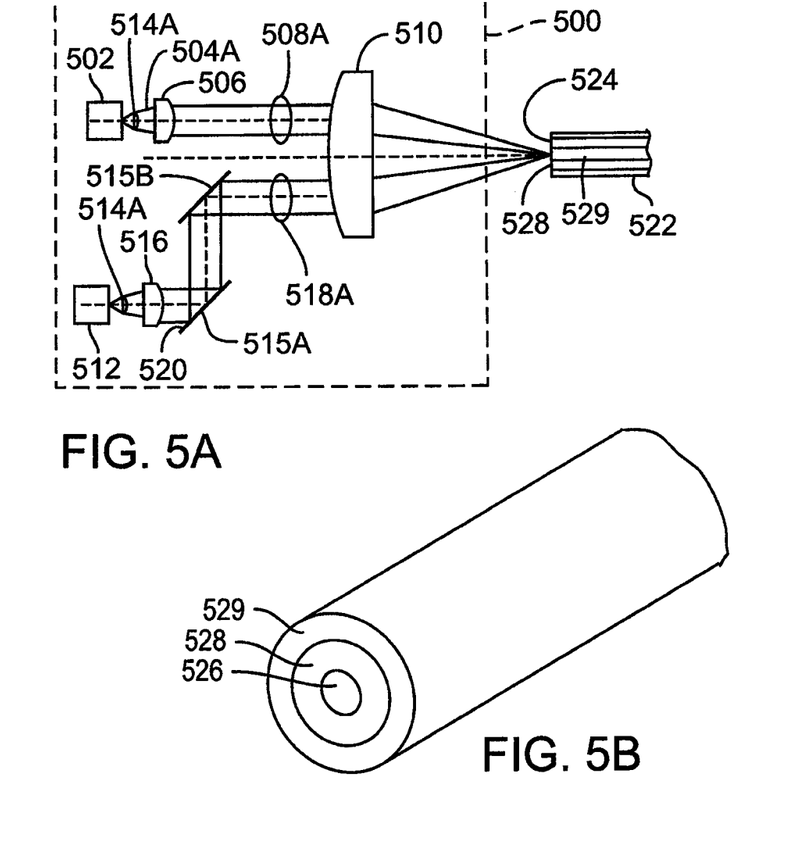
FIG. 5A is an elevational view of an illumination system.
FIG. 5B is a sectional view of the optical fiber of FIG. 5A.
Figure 5C:
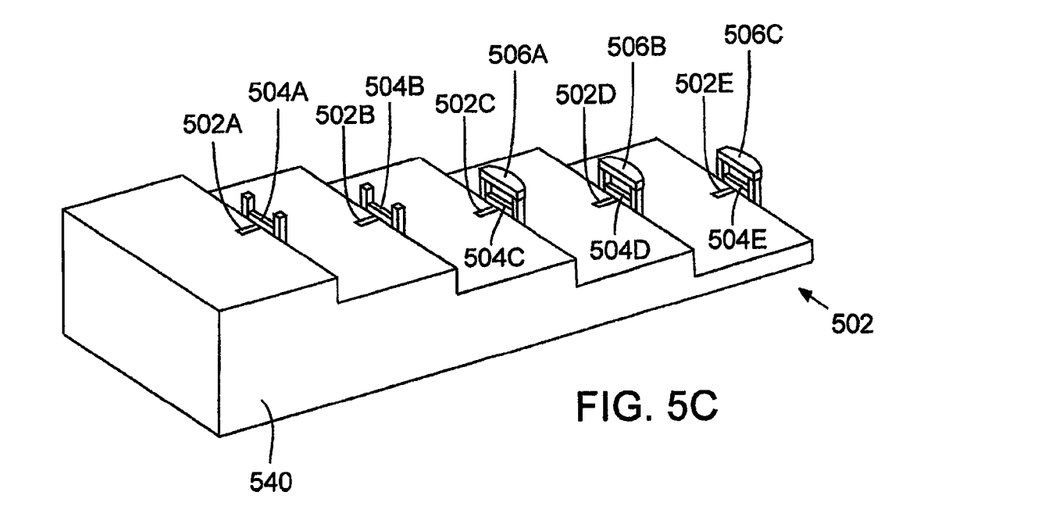
FIG. 5C illustrates representative laser arrays for the system of FIG. 5A.

A representative laser beam delivery system that includes a fiber such as those described above is shown in FIGS. 5A-5D. In the plan view of FIG. 5A, an optical radiation source 500 is configured to deliver a plurality of optical beams to an optical fiber 522. The optical radiation source 500 typically includes one or more diode laser arrays such as laser diode arrays 502, 512. As shown in FIG. 5C, the laser diode array 502 includes laser diodes 502A-502E that are configured to emit respective optical beams. For convenient illustration, optical beams only from one laser diode from each of the laser diode arrays 502, 512 are shown in FIG. 5A, and in the plan view of FIG. 5A, the remaining beams and beam processing lenses would substantially overlap with the illustrated beams. In the following description, these illustrated beams are referred to as the selected beams and corresponding laser diodes are referred to as the selected laser diodes. Some examples of suitable laser arrays are described in, for example, Farmer et al., U.S. Patent Application Publication 2007/0116077 that is incorporated herein by reference.

Referring further to FIG. 5C, optical radiation from the selected laser diode 502A of the array 502 is directed to a first lens 504A and a second lens 506A that are selected to produce an approximately collimated or otherwise processed optical beam 508A that is incident to a combiner lens 510. Optical radiation from the selected laser diode of the array 512 is directed to a first lens 514A and a second lens 516A that are selected to produce an approximately collimated or otherwise processed optical beam 518A that is incident to the combiner lens 510 via reflective surfaces 515A, 515B that can be provided with mirrors or as surfaces of one or more prisms. The lenses 504A, 514A and the lenses 506A, 516A have substantially the same optical prescriptions such as thickness, radii of curvature, material type, aspheric coefficients, etc. Additional lenses are provided for each of the laser diodes in the arrays 502, 512. In other examples, one or more unitary lens assemblies such as those described in Karlsen, U.S. Patent Application Publication 2007/0086501 that is incorporated herein by reference can be used to collimate or otherwise form optical beams.

Referring to FIG. 5C, laser diodes 502A-502E are conveniently secured to a stepped mounting block 540 that is formed of a thermally conductive material such as copper. The laser diodes 502A-502C are provided with first lenses 504A-504C and second lenses 506A-506C, respectively. Additional lenses for lasers 502D-502F are not shown.

Figure 5D:
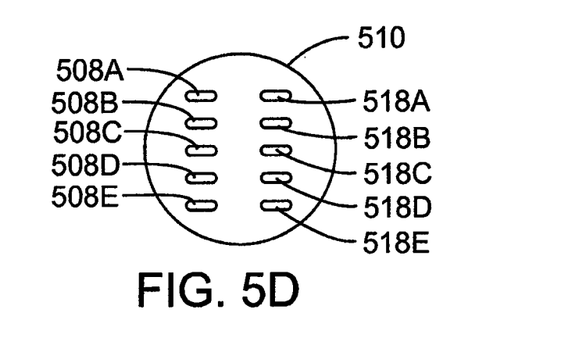
FIG. 5D illustrates a combiner lens and locations on the combiner lens at which beams from each of the lasers of the array of FIG. 5C are incident to the combiner lens.

Referring to FIG. 5D, the optical beams 508A, 518A are shown as incident to the combiner lens 510. Additional beams 508B-508E from the laser diodes 502B-502E, respectively, of the laser diode array 502 and additional beams 518B-518E from the laser diode array 512 are also shown. These beams are substantially parallel as incident to the beam combiner lens 510, and are combined at an entrance surface 524 of the fiber 522. As shown in FIG. 5A, the optical radiation source 500 includes two diode arrays having five laser diodes but more or fewer diode arrays having more or fewer emitters can be used. In some examples, single emitters can be used. Different numbers of laser diodes and/or arrays can be used in the optical radiation source 500. In addition, different wavelength ranges or combinations of wavelength ranges can be provided to the fiber 522 as preferred for a particular application.

The fiber 522 includes a core 526, a cladding 528, and a buffer 529. The core 526 is provided with a gradient refractive index by suitable doping, and a cladding refractive index is selected to provide an index step at a core/cladding interface. In some examples, the core/cladding index step is approximately the same as an index difference between core maximum and minimum refractive indices. In other examples, the index difference between the core and the cladding can be greater than about 0.01, 0.02, 05, 0.10, 0.20, 0.3, or greater.

In some examples, other light sources can be coupled to fibers such as the fiber 522. For example, one or more fiber lasers can be used. In addition, the beam produced by fibers such as the fiber 522 can be coupled so as to pump fiber amplifiers and fiber lasers so as to produce a fiber laser beam.

While particular examples are described above, in other examples fibers can have different core sizes ranging from about 1 μm to about 2.0 mm, and refractive indices of cores and claddings can be in a range of from about 1.2 to about 5.0 depending on optical radiation wavelength and material selection. Fibers typically have circular cross-sectional areas, but in other examples square, rectangular, polygonal, elliptical, or oval cross-sectional areas or combinations thereof can be used. Core refractive index can vary as a function of VIP, wherein p is a positive number. Typically p is about two, but other values can be used, and in practice, slight deviations from a selected p value are obtained in fibers fabricated based on a particular refractive index variation. In many examples, $1.0 < p < 3.5$. Selected refractive indices can be provided by ion diffusion, solution doping or other processes such as those based on fiber performs comprising nanometer sized particles selected to provide suitable refractive indices or to include passive or active dopants. In additional examples, double clad fibers can be formed in which a graded index core and a cladding are configured as described above based on a common numerical aperture or a core/cladding boundary numerical aperture different than the numerical aperture of the core, and an active or other multimode or single mode core is provided in the multimode core. In the disclosed examples, a cladding refractive index is substantially constant, but in other examples, the cladding can have a variable refractive index that can vary in a similar manner as the core.

The examples are conveniently described based on intended dimensions and refractive indices and refractive index variations. In addition, propagation axes are illustrated as centered in a fiber core. In fibers manufactured based on such specifications, fiber dimensions, refractive indices, core centration and other characteristics generally differ somewhat from design values. It will be appreciated that such variations are within the scope of the disclosed technology and are encompassed by the appended claims.

Typical practical fibers include one or more buffer layers that can have different refractive indices than either the fiber core or cladding, and can be made of materials that may or may not be appreciably optically transmissive. Generally, fiber core specifications such as shape, size, and refractive index are selected so that optical radiation is substantially confined within the core with some penetration into the cladding. Buffer layers are generally situated sufficiently distant from the core so that optical propagation is generally unaffected by the optical properties of the buffer. However, in some examples, the buffer can be configured to serve as a protective layer as well as a fiber cladding.

Figure 8:
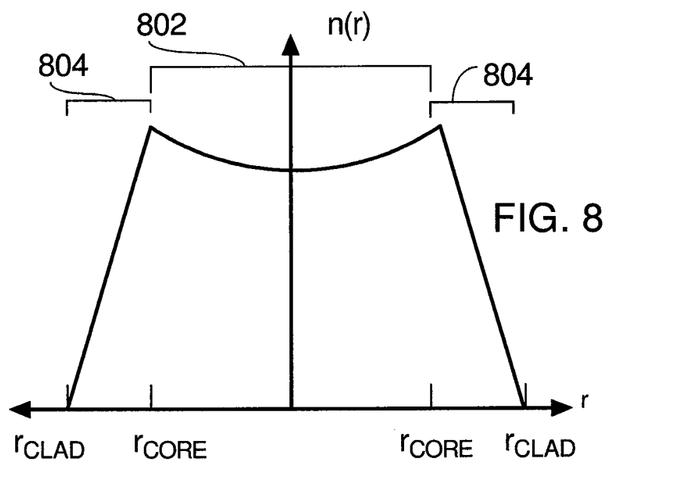
FIG. 8 is a graph of refractive index as a function of radial distance from a central axis for a representative optical fiber in which a cladding refractive index increases toward a core/cladding interface.

While fibers having larger core refractive indices at a fiber center are useful in many applications, in other examples, core refractive indices can be relatively lower at fiber center. With reference to FIG. 8, a refractive index exhibits a central gradient region 802 in which refractive index increases as a function of radial coordinate to a gradient core boundary at $r = r_{CORE}$. A step index region 804 in which refractive index decreases extends from $r_{CORE}$ to $r_{CLAD}$. The region 804 is referred to as a step index region, but as is apparent, refractive index does not change abruptly but is associated with a rate of change. For convenience, the sloped step is illustrated as varying linearly with radial coordinate, but other variations such as other powers of radial coordinate or other functional forms are possible. In some examples, the functional form results from a fabrication technique used to make the fiber such as nanoparticle deposition based methods, or conventional modified chemical vapor deposition (MCVD) The central gradient region can be associated with a continuous gradient or a stepped gradient or a combination thereof. Refractive indices such as that illustrated in FIG. 8 tend to direct optical flux towards a core perimeter.

Figure 9:
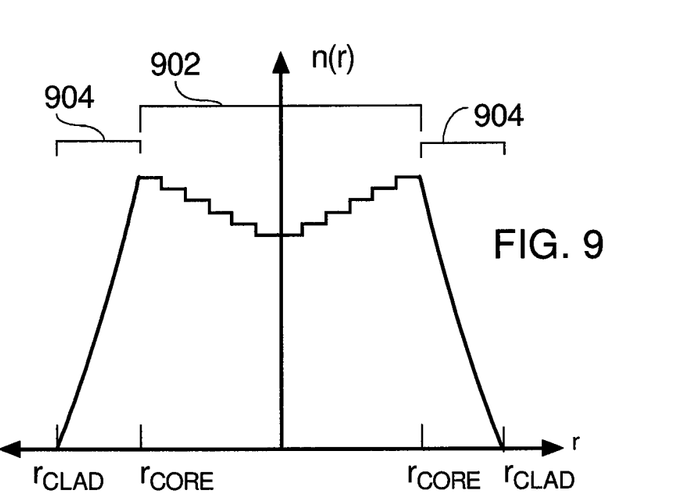
FIG. 9 is a graph of refractive index as a function of radial distance from a central axis for a representative optical fiber in which a cladding refractive index increases toward a core/cladding interface and the core refractive index is defined by a plurality of index steps.

Referring to FIG. 9, a refractive index of a light shaping fiber includes a core region 902 that is defined by a plurality of refractive index steps. A cladding region 904 has a refractive index that varies as a function of radial coordinate r, and increases rapidly with decreasing values of r. In some examples, the region 904 is substantially a refractive index step. In other examples, one or both of the core and cladding regions include one or more refractive index steps, and the core region can be configured to have a refractive index that decreases a function of r.

The disclosed examples are illustrative and are not to be taken as limiting the scope of the disclosure. I claim all that is encompassed by the appended claims.

I claim:

1. An optical illuminator, comprising:
   a light source configured to produce an optical flux; and
   a gradient index fiber situated to receive the optical flux off-axis with respect to a fiber axis and direct the optical flux along the fiber axis so as to produce an output optical flux having an associated power distribution, wherein the gradient index fiber includes a cladding and a gradient index core such that a numerical aperture defined by a core/cladding refractive index difference is at least about 0.04, and wherein a maximum refractive index difference associated with the core is substantially the same as an index difference associated with a core/cladding interface so that an output power measured on the fiber axis is within about 10% or less of a maximum power of the output power distribution.

2. The optical illuminator of claim 1, further comprising an optical system configured to produce an optical beam based on the optical flux.

3. The optical illuminator of claim 1, wherein the light source includes a laser diode beam source configured to produce the optical flux.

4. The optical illuminator of claim 1, wherein the light source is a laser diode beam source that comprises a plurality of laser diodes, and further comprising an optical system configured to produce an optical beam in which optical fluxes produced by the plurality of laser diodes overlap at an input surface of the gradient index fiber and are received by the gradient index fiber off-axis with respect to the fiber axis.

5. The optical illuminator of claim 1, wherein the light source is a laser diode beam source that comprises a two dimensional array of emission regions, and further comprising an optical system configured to substantially overlap optical fluxes from the emission regions at an input surface of the gradient index fiber.

6. The optical illuminator of claim 1, wherein the cladding has a refractive index $n_{CLAD}$, the core has a refractive index $n(0)$ near a core center and a refractive index $n(r_{MAX})$ at the core/cladding interface, wherein $n^2(r_{MAX})-n^2_{CLAD}$ is approximately equal to $n^2(0)-n^2(r_{MAX})$.

7. The optical illuminator of claim 6, wherein a numerical aperture defined by the core/cladding interface is at least about 0.10.

8. The optical illuminator of claim 1, wherein a numerical aperture of the core and a numerical aperture of the core/cladding interface are between about 0.04 and about 0.50.

9. The optical illuminator of claim 8, wherein the core numerical aperture and the core/cladding interface numerical aperture are between about 0.10 and about 0.30.

10. The optical illuminator of claim 1, wherein the core comprises doped fused silica.

11. The optical illuminator of claim 1, wherein a refractive index of the gradient index core is a function of a distance r from a center of the core.

12. The optical illuminator of claim 11, wherein the refractive index of the core is a function of $r^p$, wherein p is a number between 1 and 3.

13. The optical illuminator of claim 1, wherein the refractive index of the core is approximately $$n(0)\left(1 - B\frac{r^2}{2}\right)$$

for $|r|<r_{MAX}$ wherein r is a radial distance from a core center, $r_{MAX}$ is a radius of the core, $n(0)$ is core refractive index at r=0, and B is a constant.

14. The optical waveguide of claim 1, wherein a core diameter is between about 0.05 mm and about 2.00 mm.

15. An illumination system, comprising:
a light source configured to direct at least one optical beam along at least one emission axis; and
a light-shaping fiber situated to receive the at least one optical beam and guide the received optical beam to an output end of the fiber so as to produce an output beam having an associated power distribution, wherein the light-shaping fiber includes a cladding and a gradient index core defining a propagation axis that is angularly or laterally displaced from the at least one emission axis, wherein the cladding is configured to provide a refractive index difference at a core/cladding boundary that is substantially the same as a maximum refractive index difference associated with the gradient index core so that the power distribution has a maximum value within about 10% of a power measured along the propagation axis.

16. The illumination system of claim 15, wherein the light source includes a laser diode beam source that includes a plurality of lasers, wherein each of the plurality of lasers is configured to produce a respective optical beam directed along a respective emission axis.

17. The illumination system of claim 16, wherein the optical beams are spatially displaced and propagate along a common optical axis, and further comprising a combiner lens situated to receive the spatially displaced optical beams and direct the optical beams to a common location.

18. The illumination system of claim 15, wherein a numerical aperture of the core and a numerical aperture associated with the core/cladding boundary are between about 0.04 and 0.50.

19. The illumination system of claim 17, wherein an input end of the light-shaping fiber is situated substantially at the common location.

20. The illumination system of claim 15, wherein the gradient index core of the light-shaping fiber has a variable refractive index that decreases from a central axis and defines a core numerical aperture, and wherein the refractive index difference at the core/cladding boundary defines a core/cladding boundary numerical aperture that is greater than about 0.04.

21. The illumination system of claim 20, wherein the variable refractive index of the core is approximately $$n(0)\left(1 - B\frac{r^2}{2}\right)$$

for $|r|<r_{MAX}$, wherein r is a radial distance from a core center, $r_{MAX}$ is a radius of the core, $n(0)$ is core refractive index at r=0, and B is a constant.

22. The illumination system of claim 20, wherein the cladding has a refractive index $n_{CLAD}$, and $n^2(r_{MAX})-n^2_{CLAD}$ is approximately equal to $n^2(0)-n^2(r_{MAX})$.

23. The illumination system of claim 20, wherein the core and the core/cladding boundary numerical apertures are between about 0.10 and about 0.27.

24. The illumination system of claim 23, wherein the core and the core/cladding boundary numerical apertures are between about 0.15 and about 0.23.

25. The illumination system of claim 20, wherein the core comprises doped fused silica.

26. A method, comprising:
providing a fiber having a variable refractive index core and a cladding, the variable refractive index core defining a fiber axis, wherein a numerical aperture associated with a core/cladding boundary is greater than about 0.04, and wherein a numerical aperture associated with the variable refractive index core is substantially the same as the core/cladding boundary numerical aperture;
coupling displaced optical beams from a plurality of emitters into an input end of the fiber such that one or more of the displaced optical beams is received off-axis with respect to the fiber axis; and
directing the coupled optical beams from an output end of the fiber along a propagation axis to a target, wherein an output power measured on the propagation axis is within about 10% or less of a maximum power of an output power distribution of the fiber.

27. The method of claim 26, wherein the target is a laser gain material.

28. The method of claim 26, wherein the cladding refractive index is a variable refractive index.

29. The optical illuminator of claim 1, wherein the fiber axis corresponds to a central axis of the fiber.

30. The optical illuminator of claim 1, wherein the optical flux is off-axis with respect to the fiber axis such that the gradient index fiber converts at least 80% of the optical flux coupled into the gradient index fiber into lower order modes so that the output power distribution is substantially Gaussian.

31. The optical illuminator of claim 5, wherein the optical fluxes are spatially displaced and substantially parallel as incident to the optical system.

32. The optical illuminator of claim 31, wherein the optical system is configured to direct the optical fluxes to the gradient index fiber so that the fiber receives each of the optical fluxes off-axis with respect to the fiber axis.

33. The illumination system of claim 15, wherein, for a numerical aperture cone having an angular radius sufficient to receive about 90% of total emitted power, a minimum power in the cone occurs within about 10% of the angular radius.

34. The illumination system of claim 17, wherein the common optical axis is substantially the same as the propagation axis.

35. The illumination system of claim 20, wherein the central axis is the same as the propagation axis.

* * * * *